2,999,889
DIVINYLMAGNESIUM AND METHOD OF MAKING

Donald J. Foster, South Charleston, and Erich Tobler, Charleston, W. Va., assignors to Union Carbide Corporation, a corporation of New York
No Drawing. Filed Aug. 10, 1959, Ser. No. 832,463
4 Claims. (Cl. 260—665)

This invention relates to a new composition of matter, divinylmagnesium, and a method of making it.

Vinyl derivatives of magnesium heretofore known in the art have all included a halogen or other element in the molecule. It would be most desirable for synthesis purposes, however, to have a halogen-free and solvent-free vinyl derivative of magnesium. Such a compound could be used in vinylating organic and inorganic materials without contaminating the product with the usual impurities associated with Grignard reagents.

We have now succeeded in making divinylmagnesium, a new compound. Divinylmagnesium is a white, infusible solid, substantially insoluble in aromatic and aliphatic hydrocarbons but readily soluble in ether. It decomposes when heated in a vacuum to temperatures above about 80° C. In our process magnesium is reacted with the vinyl compound of a metal more electronegative than magnesium, preferably divinylmercury according to the equation:

$$(CH_2=CH)_2Hg + Mg \rightarrow (CH_2=CH)_2Mg + Hg$$

The process can be carried out in a solvent or in the absence of a solvent. The coproduct of the reaction, metallic mercury, is easily removed from the reaction mixture to yield an essentially pure reaction product without the need for further purification. When an ether solvent is employed it can be readily removed from the product by slight warming of the product under reduced pressure.

In a preferred embodiment of the process of the invention, magnesium turnings are reacted with divinylmercury in an ether solvent such as diethyl ether and under an inert atmosphere such as dry nitrogen. When the reaction is complete, the supernatant liquid, containing the divinylmagnesium, is removed. The divinylmagnesium may then be employed in the ether solution if desired, or the ether may be removed under reduced pressure.

The reaction process is preferably carried out in a solvent or reaction medium. Suitable solvents include aliphatic and aromatic hydrocarbons such as pentane, hexane, heptane, benzene, toluene, xylene, as well as lower aliphatic ethers, tetrahydrofuran, tetrahydrothiophene, dioxane, ethylene glycol diphenyl ether, diethylene glycol diphenylether, and the like. Preferred solvents are aliphatic ethers containing from two to twelve carbon atoms such as methyl ether, methyl ethyl ether, ethyl ether, n-propyl ether, isopropyl ether, n-butyl ether, isobutyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene glycol diethyl ether, diethylene glycol ethyl butyl ether, diethylene glycol dibutyl ether, diethylene glycol ethyl hexyl ether, and the like.

While magnesium turnings are a preferred form of the magnesium, it can be any form small enough for reaction, as in a powder, slivers, granules, etc. A stoichiometric ratio of reactants is preferred, but the ratio can be widely varied without affecting the outcome of the reaction. Temperature is not critical in the reaction and the temperatures from 0° C. up to 100° C. or higher can be employed, with the temperature desired being determined largely by the solvent used. When no solvent is employed a temperature below about 80° C. is preferred. With ether solvents good reaction rates are obtained at temperatures between about 0° C. and about 35° C. When hydrocarbon solvents are employed the solvent may be heated to reflux temperature. Atmospheric pressure is ordinarily employed but higher or lower pressures may be used if compatible with the solvent and temperature. In removing ether solvent from the reaction product warming at temperatures up to about 50° C. at pressures of 20 to 1 millimeter of mercury is quite satisfactory.

Divinylmagnesium is useful as an intermediate for organic synthesis. It is highly pyrophoric and hence is useful for this property. For example it can be added in small quantities to fuels for jet engines to prevent so-called "flame-out." Also it can be mixed with hydrocarbon rocket fuels in concentrations up to 30 percent in order to improve burning and reduce screech.

The divinylmercury used in the process may be made by adding mercuric chloride to vinylsodium in a solvent such as butyl ether.

Example I

A mixture of 2.4 grams (0.1 gram atom) of magnesium turnings, 25.5 grams (0.1 mol) of divinylmercury and 200 milliliters of anhydrous ethyl ether were stirred in an inert atmosphere at room temperature. After about ten minutes particles of metallic mercury became visible and within an hour, all the magnesium had disappeared. The reaction mixture was stirred at room temperature for an additional two hours before the supernatant liquid was removed with nitrogen pressure and the residue washed with 3 portions of 25 milliliters each of anhydrous ethyl ether.

The residue was washed with water and then dilute hydrochloric acid. The residue contained 17.4 grams (87 percent of theory) of metallic mercury.

The ethyl ether was removed from the filtrate under a reduced pressure of 20 millimeters of mercury and was then heated to a temperature of 50° C. at a pressure of less than 1.0 millimeter of mercury. Divinylmagnesium was found to be a white, infusible solid, practically insoluble in aromatic and aliphatic hydrocarbons but readily soluble in ether. A comparison of the theoretical and actual carbon, hydrogen, magnesium analysis showed the following:

Calculated for $C_4H_6Mg$: C, 61.27; H, 7.71; Mg, 31.02.
Found: C, 61.4; H, 7.8; Mg, 30.8.

Divinylmagnesium was dissolved in ethyl ether and reacted at a temperature of 0° C. with 1,2-propylene oxide to give a 60 percent yield of methyl allyl carbinol after aqueous hydrolysis. The product was compared chemically and spectroscopically with an authentic sample of methyl allyl carbinol and found to be identical.

Example II

A mixture of 12.8 grams (0.05 mol) divinylmercury, 1.2 grams (0.05 gram atom) of magnesium turnings and 100 milliliters of hexane were stirred in an inert atmosphere of argon at a temperature of 60° C. A white solid along with metallic mercury was soon deposited. After four hours at reaction temperature, the product was cooled to room temperature and a sample of the white solid was removed. This material was shown to be identical with the product obtained in Example I. The reaction residue was washed with several portions of fresh ethyl ether to remove any compounds containing organic residues. The metallic residue was washed with water and then dilute hydrochloric acid to dissolve any metallic magnesium or magnesium compounds. The residue of metallic mercury weighed 8.0 grams and represented a yield of 80 percent of the theoretical.

*Example III*

A mixture of 5.1 grams (.02 mol) of divinylmercury and 0.5 gram (.02 gram atom) of magnesium was added to an evacuated Pyrex tube of 100 milliliter capacity and sealed off. The reaction tube was heated slowly to a temperature between 125° C. and 140° C. At this temperature the reaction was instantaneous producing the pyrophoric divinylmagnesium.

*Example IV*

A butyl ether slurry containing 135 grams (0.5 mol) of mercuric chloride was added portion-wise to a butyl ether suspension containing 50 grams (1.0 mol) of vinylsodium maintained at a temperature of about minus 10° C. After the addition was complete, the reaction mixture was stirred for an additional thirty minutes before it was allowed to come to room temperature. Water was added to hydrolyze unreacted starting material and dissolved the inorganic salts. The organic layer was dried over magnesium sulfate and distilled at a reduced pressure of 20 millimeters of mercury. After removal of the solvent, the product boiled at a temperature of 59° C. to 61° C. at 20 millimeters. This product was divinylmercury.

What is claimed is:

1. As a new composition of matter divinylmagnesium.
2. Process for making divinylmagnesium which comprises reacting magnesium with divinylmercury.
3. Process for making divinylmagnesium which comprises reacting magnesium with divinylmercury, the reaction being carried out in a solvent reaction medium.
4. Process for making divinylmagnesium which comprises reacting magnesium with divinylmercury, the reaction being carried out in a solvent reaction medium, said solvent being an aliphatic ether containing from two to twelve carbon atoms.

References Cited in the file of this patent
UNITED STATES PATENTS

| | | |
|---|---|---|
| 1,963,935 | Carothers et al. | June 19, 1934 |
| 2,838,508 | Ramsden | June 10, 1958 |
| 2,873,287 | Ramsden | Feb. 10, 1959 |